Dec. 30, 1958

C. H. SCOTT 2,866,352

DRIVE MECHANISM FOR PIER SUPPORTED ROTARY
RAKE STRUCTURE FOR SETTLING TANKS

Filed Jan. 27, 1956

INVENTOR.
Charles H. Scott

BY Theodore M. Jablon
ATTORNEY

Dec. 30, 1958  C. H. SCOTT  2,866,352
DRIVE MECHANISM FOR PIER SUPPORTED ROTARY
RAKE STRUCTURE FOR SETTLING TANKS
Filed Jan. 27, 1956  9 Sheets-Sheet 6

Fig. 6.

INVENTOR.
Charles H. Scott

BY Theodore M. Jablon
ATTORNEY

INVENTOR.
Charles H. Scott

United States Patent Office 2,866,352
Patented Dec. 30, 1958

2,866,352

DRIVE MECHANISM FOR PIER SUPPORTED ROTARY RAKE STRUCTURE FOR SETTLING TANKS

Charles H. Scott, South Norwalk, Conn., assignor to Dorr-Oliver Incorporated, Stamford, Conn., a corporation of Delaware Application January 27, 1956, Serial No. 561,770

6 Claims. (Cl. 74—410)

This invention relates to settling tanks of the centerpier type in which a solids carrying feed liquid is admitted centrally at the top of the tank while clarified liquid overflows at the periphery, and a rotary raking structure conveys settled solids over the tank bottom to a zone or point of outlet usually at the center of the tank.

In such tank the rake structure has a central cage portion surrounding the center pier which in turn has annular bearing means at the top for rotatably supporting the rake structure. Powered drive mechanism is also provided atop the center pier, to engage a large annular bull gear that is unitary with the raking structure for rotating the same. In such a tank the feed liquid is usually brought in through a feed conduit underneath the tank bottom and up through the hollow center pier which in turn has outlet openings at the top for admitting the feed liquid into the quiescent liquid body in the tank, in order that solids may settle upon the tank bottom while clarified liquid overflows at the periphery of the tank.

More particularly, this invention relates to improvements in the power drive mechanism or drive head for rotating the pier-supported raking structure in such a tank.

A problem lies in how to apply a balanced or true drive torque to the rake structure by way of a plurality of drive pinions engaging the bull gear at various points of its periphery, and in such a manner that interbalanced shares of the drive torque be imparted to the respective drive pinions so that power requirements as well as wear and tear upon the mechanism should be minimized.

Balanced drive mechanism for actuating such rake structure is known from the patent to Scott No. 2,086,394, insofar as it comprises a single pair of drive pinions engaging the bull gear at diametrically opposed points, which pinions are driven simultaneously through a pair of gear trains extending in opposite directions from a prime mover or motor atop the center pier. The motor torque is transmitted to the gear trains by way of compensatory torque balancing means whereby interbalanced equal shares of the motor torque are transmitted to the respective drive pinions engaging the bull gear.

It is an object to provide a plurality of drive pinions in excess of two, along with means for applying drive torque to the respective pinions efficiently in the sense that the driving torque reactions of the respective pinions be maintained substantially equal and interbalanced with the result that power requirements as well as wear and tear upon the mechanism can be further reduced.

That object is attainable by providing at least one of the two gear trains with a pair of drive pinions for engaging and driving the bull gear, and further providing secondary compensatory drive means to engage both these pinions in a manner to apply thereto interbalanced torque imparting forces, which secondary compensatory means in turn are driven from the motor through the compensatory means associated therewith.

In this way, the drive motor operates through primary compensatory means applying interbalanced torque-imparting forces to the respective gear trains emanating from the motor, while secondary compensatory means are in turn effective within at least one gear train in a manner to simultaneously transmit interbalanced torque-imparting forces to the pair of drive pinions at the end of that train.

In one form of the invention, at least one of the two gear trains has a pair of drive pinions simultaneously engaging the bull gear, each pinion being driven by a worm gear, with secondary compensatory means are provided in the form of a double-acting wormshaft driving both said worm gears in a manner to apply interbalanced torque-imparting forces to both said pinions, which wormshaft in turn is driven from the motor through the primary compensatory means associated therewith.

According to a feature, the primary compensatory torque imparting means is in the nature of a differential gear device having a pair of output shafts, each of which imparts torque to a respective gear train, while the secondary compensatory torque imparting means is in the nature of said double-acting wormshaft simultaneously driving said pair of pinions in a manner to impart thereto equal and interbalanced shares of driving torque.

More specifically, in the case of a four-pinion drive, that is where two pairs of drive pinions engage the bull gear, each gear train comprises a pair of drive pinions with its double-acting axially balanced wormshaft, each wormshaft in turn being positively driven by a respective output shaft of the differential gear device. In the case of a three-pinion drive, that is where three pinions engage the bull gear, one gear train comprising a pair of drive pinions receives a torque twice as large as that imparted to the other gear train which is provided with only one drive pinion. With respect to what is herein briefly termed a gear train, that term as here understood comprises in a practical broader sense a train of torque transmitting drive elements.

According to another feature relating to the four-pinion species of the mechanism, each pair of pinions is driven by a double-acting axially balanced wormshaft, while the primary compensatory torque balancing means comprise a torque-transmitting reduction gear unit in each gear train. Both reduction gear units have positive drive connection with the motor, and also have between them a torque balancing functional connection whereby torque is applied in equal shares to the respective gear trains. That is to say, each reduction gear unit is carried bodily and floatingly upon the inner end of a respective double-acting wormshaft, and the floatingly mounted housing structure of the one unit is functionally connected with the floatingly mounted housing structure of the other unit in such a manner that the torque reaction of the one housing structure balances against the torque reaction of the other housing structure, thus insuring that equal and interbalanced shares of driving torque are imparted to the respective gear trains.

As this invention may be embodied in several forms without departing from the spirit or essential characteristics thereof, the present embodiment is therefore illustrative and not restrictive since the scope of the invention is defined by the appended claims rather than by the description preceding them, and all changes that fall within the metes and bounds of the claims, or of forms that are their functional as well as conjointly cooperative equivalents, are therefore intended to be embraced by those claims.

Figure 1:
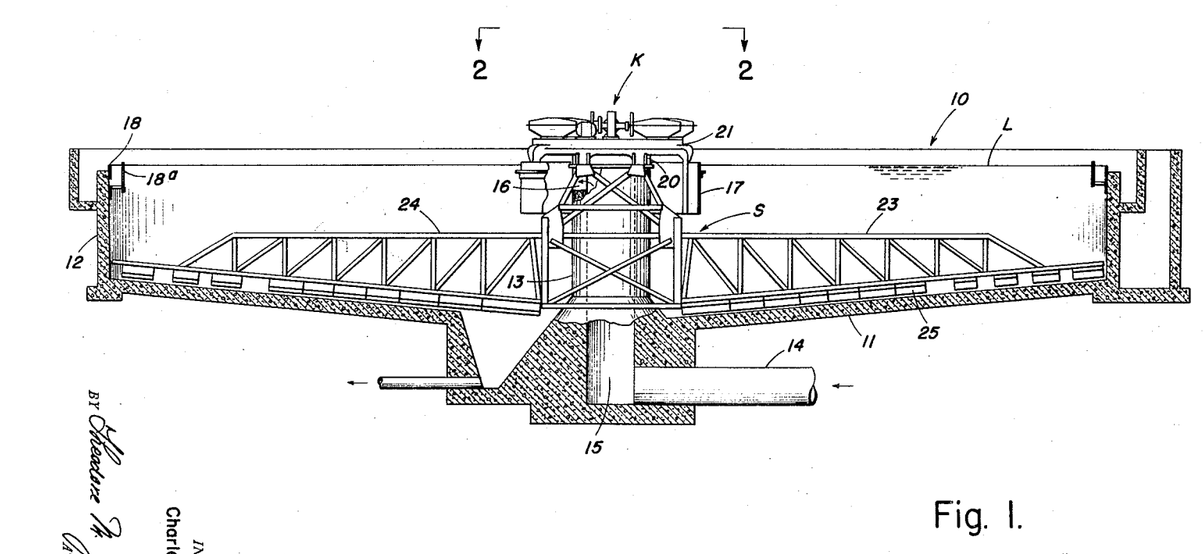
Figure 1 is a diagrammatic sectional view of the center pier type of tank, showing one embodiment of the drive mechanism with four-pinion drive for the bull gear, with a primary torque-transmitting differential device driving a pair of axially balanced worm shafts.

A tank construction with pier supported rotary sediment raking structures according to Figure 1 comprises the tank 10 proper which has a shallow conical bottom 11, a cylindrical wall 12, and a hollow center pier 13. Feed liquid enters the tank from the bottom through a feed conduit 14, and rises through the vertical hollow 15 of the center pier to be admitted into the body of quiescent liquid in the tank, by way of feed openings 16 provided in the top end of the pier. Solids carrying liquid thus entering the tank is first stilled and deflected downwardly as by a feed well 17.

While solids settle to the tank bottom the liquid passes to a peripheral overflow weir 18 into a surrounding effluent launder 19, the overflow 18 determining the liquid level L of the liquid body in the tank. A usual scum baffle is indicated at 18$^a$.

Figure 2:
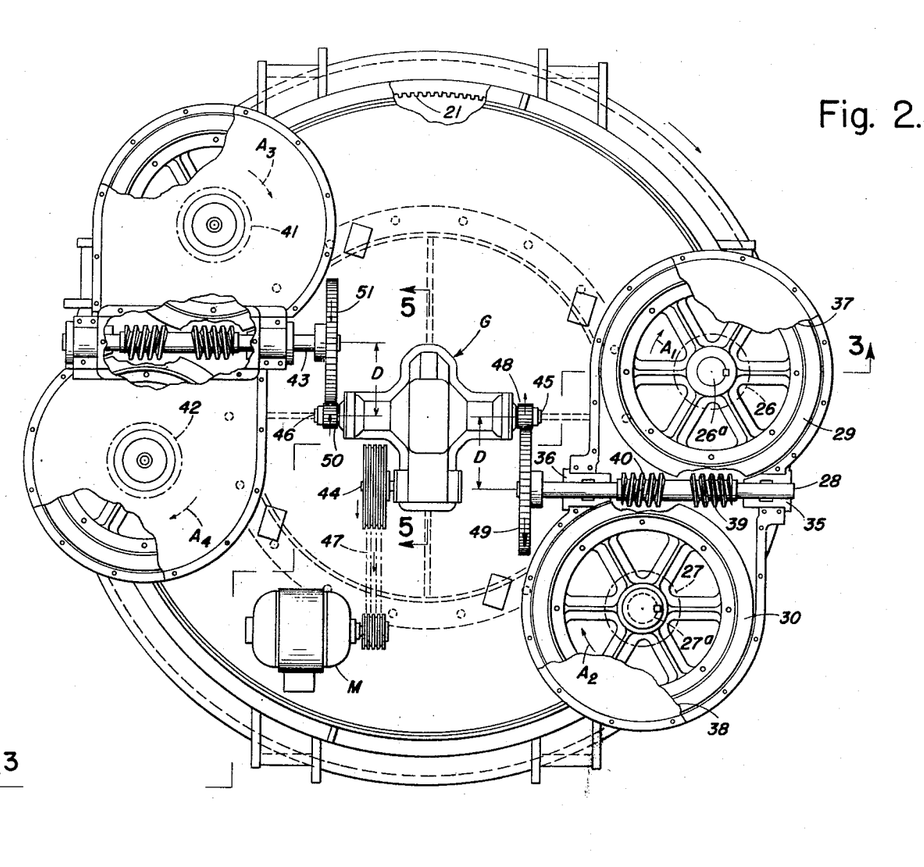
Figure 2 is a greatly enlarged detailed top view taken on line 2—2 of Figure 1 of the drive mechanism, comprising two pairs of drive pinions constituting a four-pinion drive for the bull gear, with powered differential gear device imparting interbalanced shares of the driven torque to each of the four drive pinions engaging the bull gear.
Figure 3:
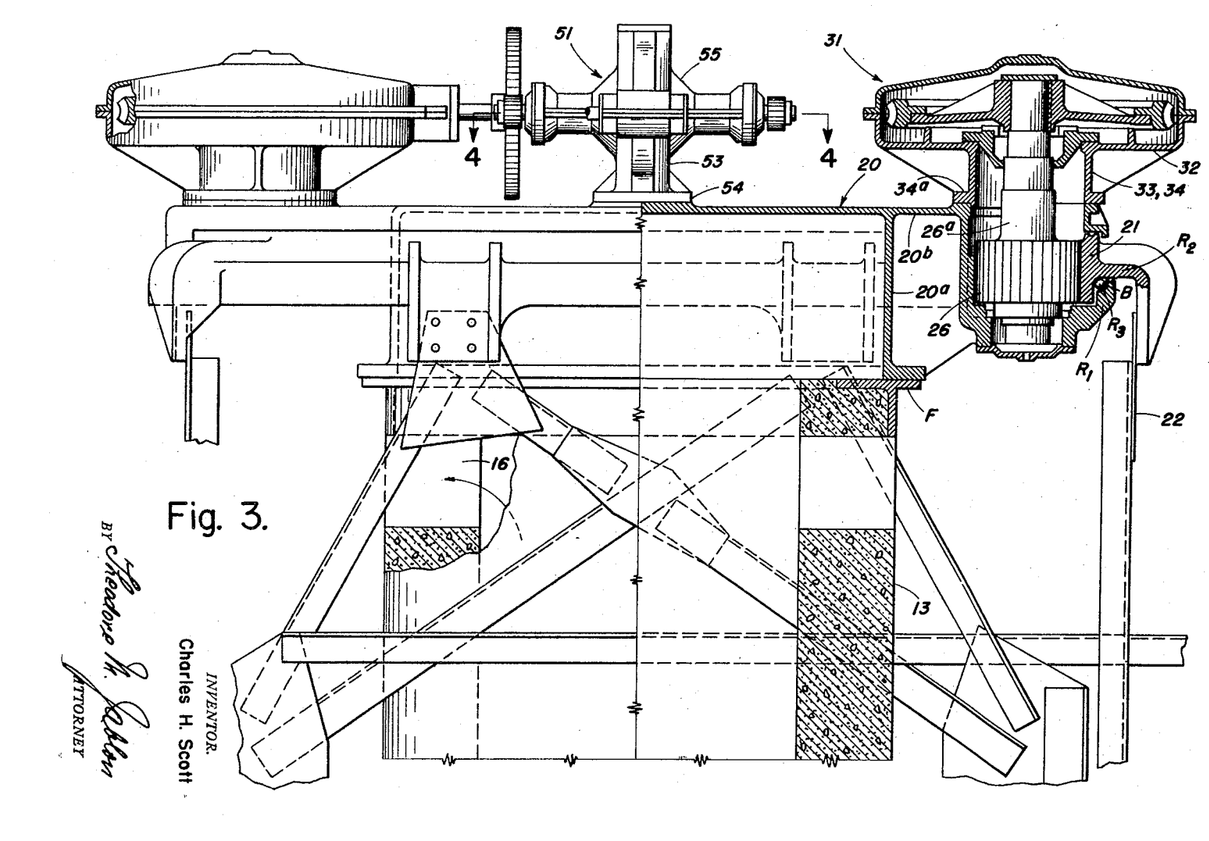
Figure 3 is a sectional detailed view of the drive mechanism mounted atop the center pier, the section being taken on line 3—3 of Figure 2.

Drive mechanism K for the rake structure S, is mounted atop the center pier and is diagrammatically indicated in Figure 1, but shown in greater detail in Figures 2 and 3.

Atop the center pier 13 there is fixedly mounted a platform structure or casting 20 for rotatably supporting thereon the raking structure S as well as for mounting thereon the driven mechanism K therefor. The raking structure S comprises at the top a bull gear 21 to which is rigidly connected downwardly a cage portion 22 of structural steel members surrounding the center pier.

From this cage portion 22 extend a usual pair of rake arms 23 and 24 constiuted of structural steel members and carrying the usual sediment engaging raking blades 25.

The platform structure 20 has a central cylindrical portion 20$^a$ the lower flanged end of which is shown to be bolted to a flange member F constituting the upper terminal portion of the center pier 13. The platform structure 20 further comprises an overhanging peripheral portion 20$^b$ which presents annular bearing support for the bull gear 21 and thus for the support and rotation of the raking structure S.

That is to say, the bull gear 21 and the platform structure 20 constitute an annular bearing B comprising a stationary lower race $R_1$ and a rotary upper race $R_2$ with anti-friction rollers $R_3$ interposed.

According to the embodiment of Figures 1 to 5 the drive mechanism K atop the center pier 13 is what is herein called a four-pinion drive in as much as it comprises two pairs of pinions engaging the bull gear 21, all four drive pinions being rotatably mounted in the overhanging portion 20$^b$ of the platform structure 20. That is to say, there is one pair of pinions 26 and 27 or pinion shafts 26$^a$ and 27$^a$ simultaneously engaged and driven by a double-acting wormshaft 28 engaging worm gears 29 and 30 which are fixed to the upper ends of the pinion shaft 26$^a$ and 27$^a$ respectively.

A casing 31 surrounds both worm gears 29 and 30 and comprises a lower pan-shaped casing portion 32 embracing both worm gears 29 and 30, and having a pair of downward neck portions 33 and 34 to enclose the respective pinion shafts 26$^a$ and 27$^a$, which neck portions 33 and 34 have a rigid flange connection 34$^a$ with the platform structure 20. The casing 31 provides a pair of end bearings 35 and 36 for the respective worm gears 29 and 30 as well as a cover portion for the worm shaft 28.

The wormshaft 28 has unitary therewith a pair of worms 39 and 40, the worm 39 having a direction of pitch opposite to that of worm 40, whereby the axial thrust upon the form shaft is neutralized while equal and interbalanced shares of driving torque are imparted to the respective worm gears and their associated drive pinions 26 and 27 which pinions thus impart equal and interbalanced shares of drive torque to the bull gear 21, both worm gears 29 and 30 being rotated in the same sense indicated by the clockwise direction of arrows $A_1$ and $A_2$. A second pair of drive pinions 41 and 42 together with its portion of the drive mechanism such as worm gears, worm shaft, and gear casing function substantially in a manner identical, and are disposed substantially symmetrical with respect to the first mentioned pair of drive pinions 26 and 27, so that the detailed description of the second pair of drive pinions and their accessories need here not be repeated. Suffice it to say that the second pair of drive pinions 41 and 42 is rotated by a second double-acting worm shaft 43 to impart interbalanced and equal shares of driving torque to the pinions 41 and 42 and thus to the bull gear 21, as both pinions are rotated in the identical sense indicated by the clockwise direction of arrows $A_3$ and $A_4$.

Both double-acting worm shafts 28 and 43 are parallel coextensive although each spaced a distance "D" apart from the center line. Both worm shafts are simultaneously driven from a motor M by way of a differential gear device G which has an input shaft 44 and a pair of output shafts 45 and 46. The motor M drives the input shaft 44 in any suitable manner as through a V-belt or chain drive indicated at 47, the output shafts 45 and 46 being geared up to drive the respective worm shafts 28 and 43. That is to say, the output shaft 45 has fixed upon it a pinion 48 meshing with a gear 49 that is fixed upon the one wormshaft 28, while output shaft 46 has fixed upon it a pinion 50 meshing with a gear 51 that is fixed upon the other wormshaft 43.

Figure 4:
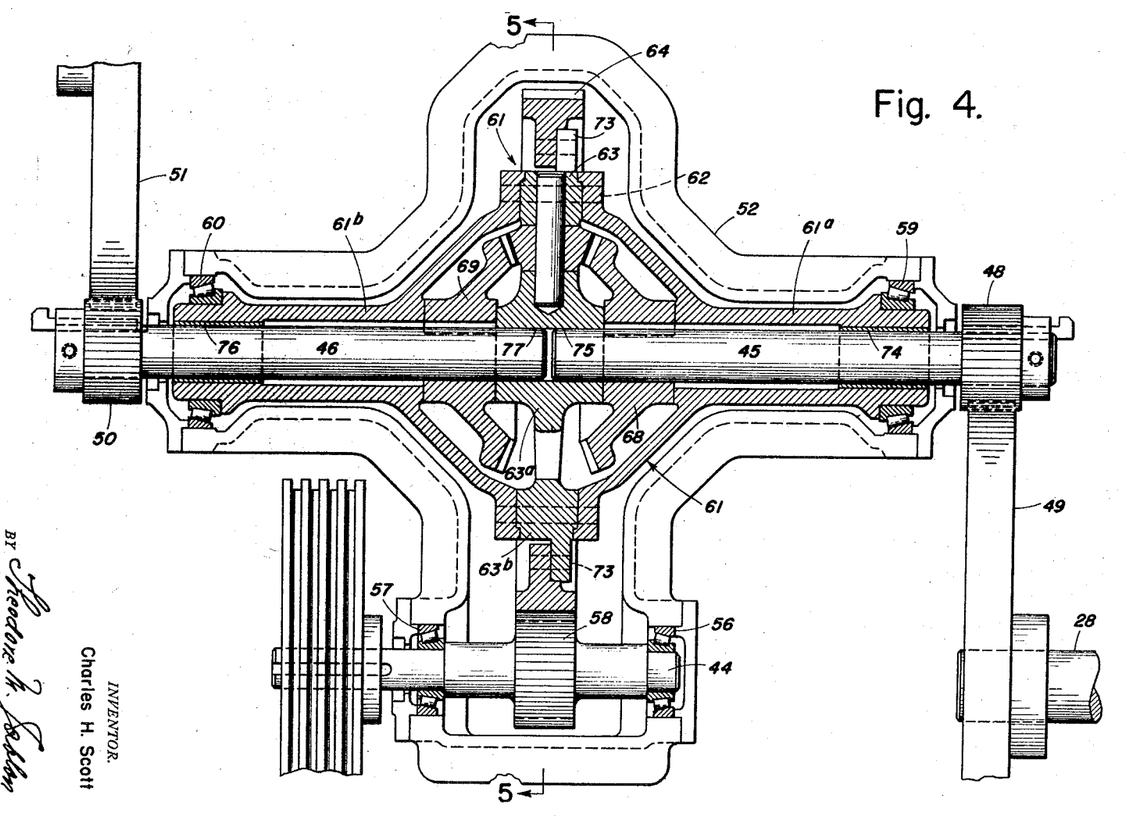
Figure 4 is a further enlarged detailed sectional top view of the differential gear device along line 4—4 of Figure 3, the top of the gear housing removed to expose the differential gear arrangement.
Figure 5:
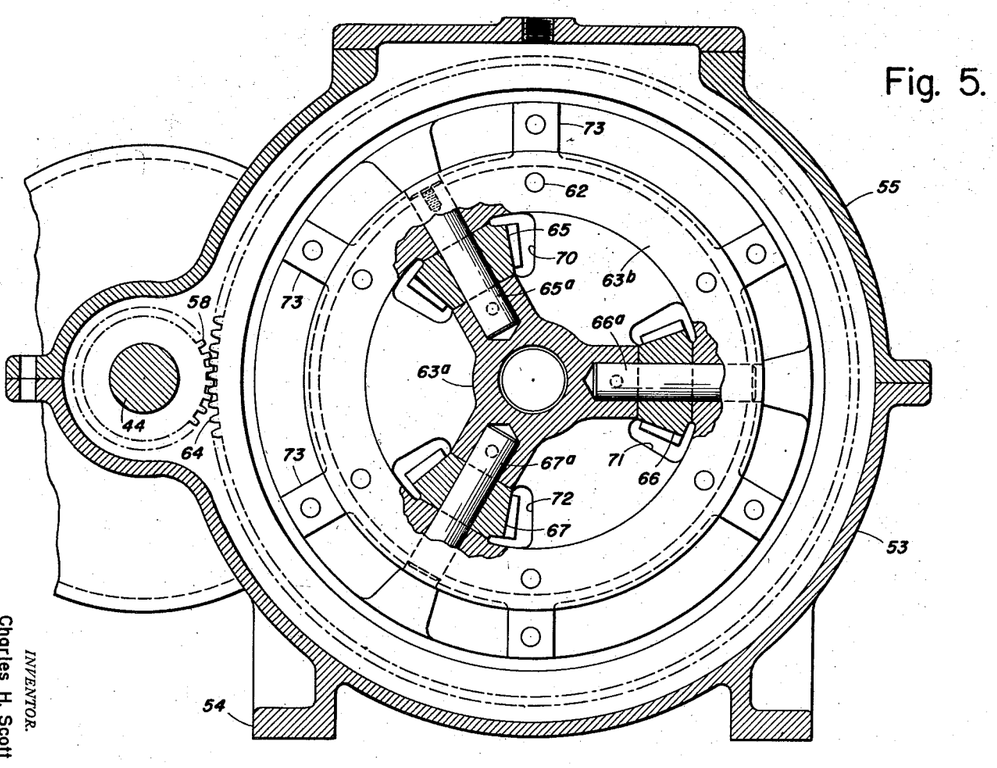
Figure 5 is a vertical section of the differential gear device taken on line 5—5 of Figure 4.

The detailed construction of the differential gear device G as shown in Figures 4 and 5 is described as follows:

The differential gearing is enclosed and mounted in a housing 52 that appears cross-shaped in a plan view (see Fig. 4). The housing is horizontally split and comprises a lower portion 53 formed with a foot or base flange 54 whereby it is bolted to the platform structure 20, and a top or cover portion 55. This housing 51 provides a pair of roller bearings 56 and 57 for the input shaft 44 which is unitary with an input drive pinion 58. This housing also provides another pair of roller bearings 59 and 60 for a rotary cage construction 61 which comprises end sections 61$^a$ and 61$^b$ bolted together as at 62. Interposed between the end sections 61$^a$ and 61$^b$ and rigid therewith is an intermediate member or cage portion 63 to serve as mounting for a gear ring 64 surrounding the cage member 61, and also as mounting for a set of three epicycloidal bevel gears 65, 66, 67 (see also Fig. 5), to mesh with a pair of companion bevel gears 68 and 69 within the cage member 61. The intermediate cage portion 63 is somewhat in the shape of a disc member comprising a hub portion 63ª, a rim portion 63ᵇ, and has openings 70, 71, 72 provided for accommodating the epicycloidal bevel gears 65, 66, 67. Lug portions 73 extend outwardly from the rim portion 63ᵇ for mounting the outer gear ring 64.

The two companion bevel gears 68 and 69 are fixed to the respective output shafts 45 and 46 each of which has its bearings provided by the cage construction 61. That is to say, the right hand output shaft 45 has its outer bearing 74 provided in the right hand end of the cage construction 61, and its inner bearing 75 provided in the hub portion 63ª. Similarly the left hand output shaft 46 has its outer bearing 76 provided in the left hand end of the cage construction 61, and its inner end bearing 77 in the hub portion 63ª. The epicycloidal bevel gears 65, 66, 67 each rotate about respective pins 65ª, 66ª, 67ª extending radially within the intermediate cage portion 63 and being tightly fitted therein.

In view of the foregoing description it is clear that the drive mechanism K functions in a manner whereby the motor M applies its driving torque to a primary compensatory torque transmitting means in form of the differential gear device G which transmits interbalanced and equal shares of the driving torque to a pair of gear trains each of which terminates in a pair of drive pinions engaging the bull gear, and each of which trains in turn comprises secondary compensatory torque transmitting means for applying interbalanced and equal shares of driving torque to the associated pairs of drive pinions.

That is to say, the motor M drives the cage construction 61 through input shaft 44 and pinion 58 meshing with the large gear 64 that is unitary with the cage construction 61. The input torque thus applied to the cage construction 61 is imparted in equal interbalanced shares to the output shafts 45 and 46 respectively because of the interaction of the gears 68 and 69 through the epicycloidal gears 65, 66, 67 within the cage construction 61. The output shaft 45 in turn imparts torque through output pinion 48 and gear 49 to the one axially balanced wormshaft 23 which in turn applies equal and interbalanced shares of torque to the drive pinions 26 and 27.

Similarly, the output shaft 46 of differential gear device G imparts torque through output pinion 50 and gear 51 to the other axially balanced wormshaft 43 which in turn applies equal and interbalanced shares of torque to the drive pinions 41 and 42.

Figure 6:
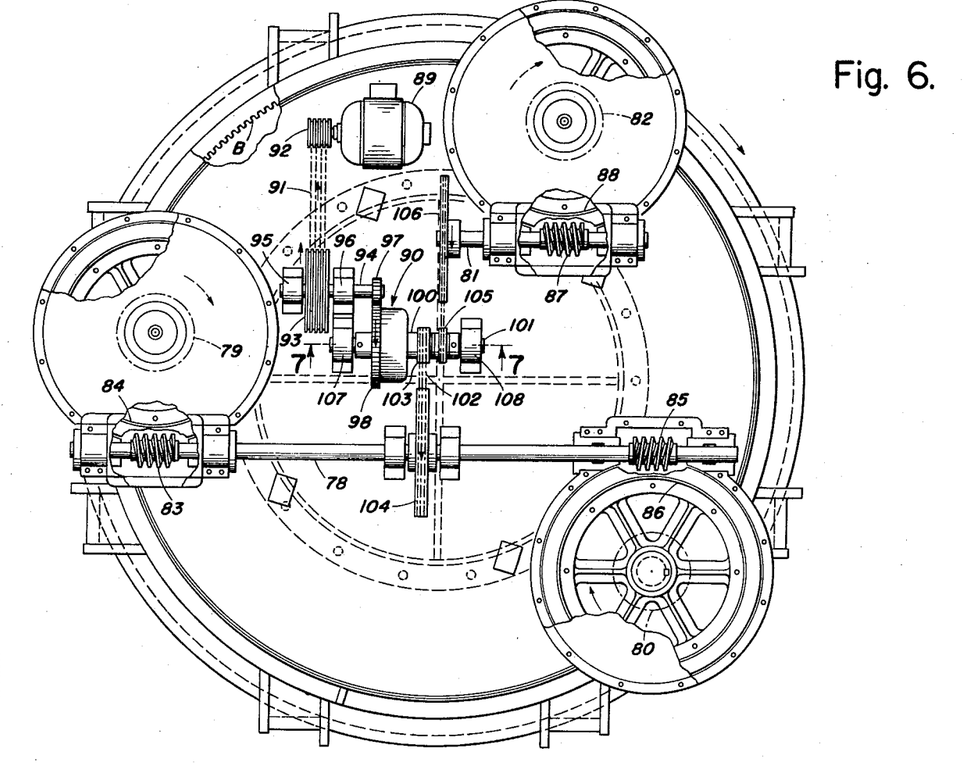
Figure 6 is a top view generally similar to that of Figure 2, showing the invention embodied in a three-pinion drive mechanism for the bull gear, with special-ratio differential gear device.

The three-pinion drive arrangement of Figure 6 employs an axially balanced twin-worm shaft 78 for driving two of the three pinions, namely pinions 79 and 80, while a single worm shaft 81 drives the third pinion 82, all three pinions meshing with an internal bull gear B. That is to say, the twin-worm shaft 78 has one worm 83 engaging a worm wheel 84 which is coaxial with and rigidly connected through a vertical shaft to the pinion 79 indicated in dot-and-dash and a companion worm 85 engaging a worm wheel 86 which is concentric with and rigidly connected through a vertical shaft to the pinion 80 shown in dot-and-dash. The single worm shaft 81 has a worm 87 engaging a worm wheel 88 which in turn is concentric with and rigidly connected through a vertical shaft to the third pinion 82. The manner in which the respective worm gears with their drive pinions and vertical shaft are mounted upon the stationary base is substantially the same as the mounting of similar elements appearing in the vertical section in Figure 3. Both worm shafts 78 and 81 are driven by a motor 89 through a differential gear device 90 which has a built-in ratio between the two output shafts of two-to-one, so that the drive torque applied to the third pinion 82 through the single worm shaft 81 will be balanced against the drive torque imposed upon the two other pinions 79 and 80 through the twin worm shaft 78. Since the torques applied to pinions 79 and 80 are in turn interbalanced through twin-worm shaft 78, there results a net interbalance of the torques applied to the three pinions 78, 80, 84.

The motor 89 through a positive belt drive, such as multiple V-belt drive 91 with multiple V-groove sheaves 92 and 93, drives a countershaft 94 journaled at 95 and 96, which through reduction gears 97 and 98 drives the differential gear unit 90. This differential gear unit 90 contains a two-to-one torque ratio or leverage appearing as between the two concentric torque output shafts 100 and 101. (See Figures 6 and 7.)

In this way, the one torque output shaft 100 will apply driving torque to the twin worm shaft 78 as through a reducing chain drive 102 comprising reducing sprockets 103 and 104, while the other torque output shaft 101 applies driving torque to the single worm shaft 81 as through a reducing chain drive comprising reducing sprockets 105 and 106. Thus, the two-to-one torque ratio or leverage between the two output shafts 100 and 101 is effective to inter-balance the driving torque reactions of the three drive-pinions as long as motor driving torque is being applied to the differential gear unit 90.

Figure 7:
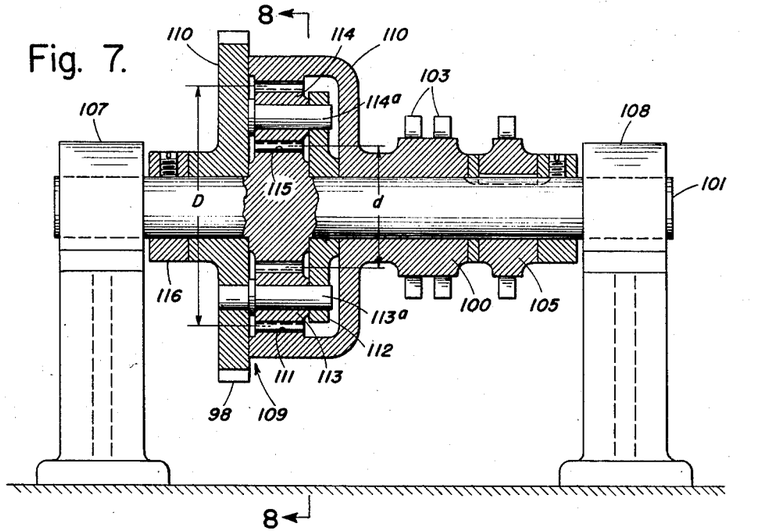
Figure 7 is a detail vertical sectional view on line 7—7 of Figure 6 of the differential gear device.
Figure 8:
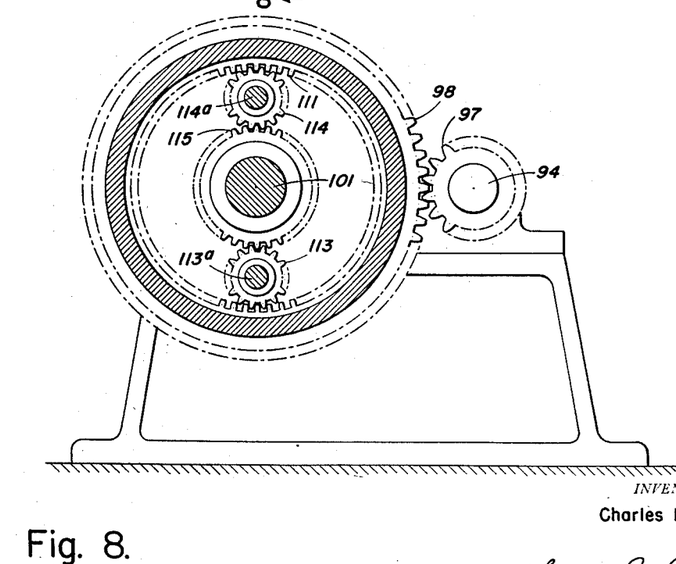
Figure 8 is a cross-sectional view on line 8—8 of Figure 7.

Referring to Figures 7 and 8, there will now be rendered a more detailed description of the two-to-one ratio differential gear unit 90 of the Figure 6 embodiment. This unit comprises the aforementioned torque output shaft 101 in a pair of bearings or journals 107 and 108. Rotatable upon this shaft is a housing 109 formed with a hub portion or axial extension which constitutes the aforementioned torque output shaft 100. This housing 109 comprises the aforementioned gear 98 driven by pinion 97 of countershaft 94. The large gear 98 in fact constitutes the closure for a housing portion 110 which in turn is provided with an internal gear 111. A cage member or pinion carrier 112 within the gear housing is loose upon the shaft 101 and carries a pair of pinions 113 and 114 diametrically opposed to one another and turnable upon pins 113a and 114a respectively, which pins are rigidly mounted upon the carrier 112. These pinions 113 and 114 mesh not only with the internal gear 111, but also with a smaller gear 115 which is part of or rigidly connected with the shaft 101. It is to be noted that the internal gear 111 has an effective or pitch diameter D which is twice the effective or pitch diameter "d" of the smaller gear 115 to provide the aforementioned two-to-one ratio or leverage required for interbalancing the torque reaction of the third drive pinion 82 against the combined although interbalanced torque reactions of the two other drive pinions 78 and 80. A collar 116 is fixed upon the shaft 101 for properly securing the gear housing 110, 111 against undue axial displacement leftward upon the shaft 101.

Figure 9:
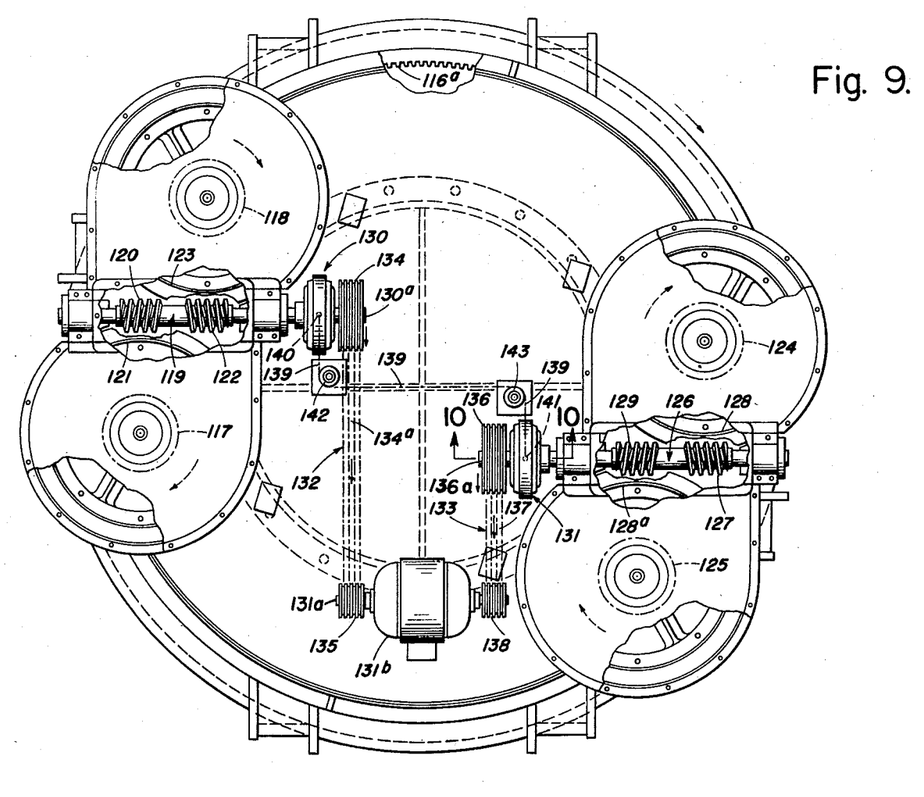
Figure 9 is a top view generally similar to those of Figure 2 and Figure 6, showing the invention embodied in a four-pinion drive mechanism for the bull gear employing a pair of axially balanced worm shafts driven through a pair of torque-wise interbalanced reduction gear units by a single motor driving both reduction gear units.

The Figure 9 embodiment employs a four pinion drive arrangement for rotating the bull gear 116a with its raking structure. That is, one pair of drive pinions 117 and 118 (shown in dot-and-dash) is driven by an axially balanced twin-worm shaft 119. That is to say, the worm shaft 119 has one worm 120 meshing with a worm gear 121 that is coaxial with and rigidly mounted to drive pinion 117 through a vertical shaft such as shown and described in the preceding embodiments, and another worm 122 meshing with a worm gear 123 that is coaxial with and rigidly connected to the drive pinion 118 through a similar vertical shaft.

Similarly, a second pair of drive pinions 124 and 125 (shown in dot-and-dash) is driven by an axially balanced twin-worm shaft 126. That is to say, the worm shaft 126 has one worm 127 meshing with a worm gear 128 that is coaxial with and rigidly connected to the pinion 124 through a vertical shaft, and another worm 129 meshing with the worm gear 128a that is coaxial with and rigidly connected to the drive pinion 125.

Each of the twin worm shafts 119 and 126 has mounted upon its inner end a reduction gear unit 130 and 131 respectively. Both reduction gear units are driven simultaneously by a motor 131b, one end of the motor shaft driving the gear unit 130 through positive drive means such as a chain drive indicated at 132, the other end of the motor shaft driving the gear unit 131 through another similar drive means such as chain drive indicated at 133. Such positive drive means are here required for applying equal torque distribution to the respective drive pinions engaging the bull gear.

More precisely, the gear unit as an input shaft 130a, a sprocket 134 or the like driven through a positive linear flexible drive element or chain 134a from a smaller sprocket 135 at one end of the motor shaft 131a. At its opposite end the motor shaft carries a sprocket 138 identical to sprocket 135 to drive a larger sprocket 138 identical to sprocket 134 as by way of chain 137.

Although gear unit 130 through its housing is carried bodily and rotatably upon and by the worm shaft 119, and gear unit 131 through its housing carried similarly by the worm shaft 126, it is to be noted that the respective torque reactions imposed upon the respective floating gear housings when motor power is applied are constantly balanced against one another as an interbalancing connection shown to be in the form of a chain or other flexible linear element 139 having one anchoring point at 140 upon the housing gear unit 130 and another anchoring point at 141 upon the housing of gear unit 131, a pair of pulleys, sheaves or sprockets 142 and 143 being shown to guide the interbalancing element 139 from the one anchoring point or housing to the other.

Figures 10, 11:
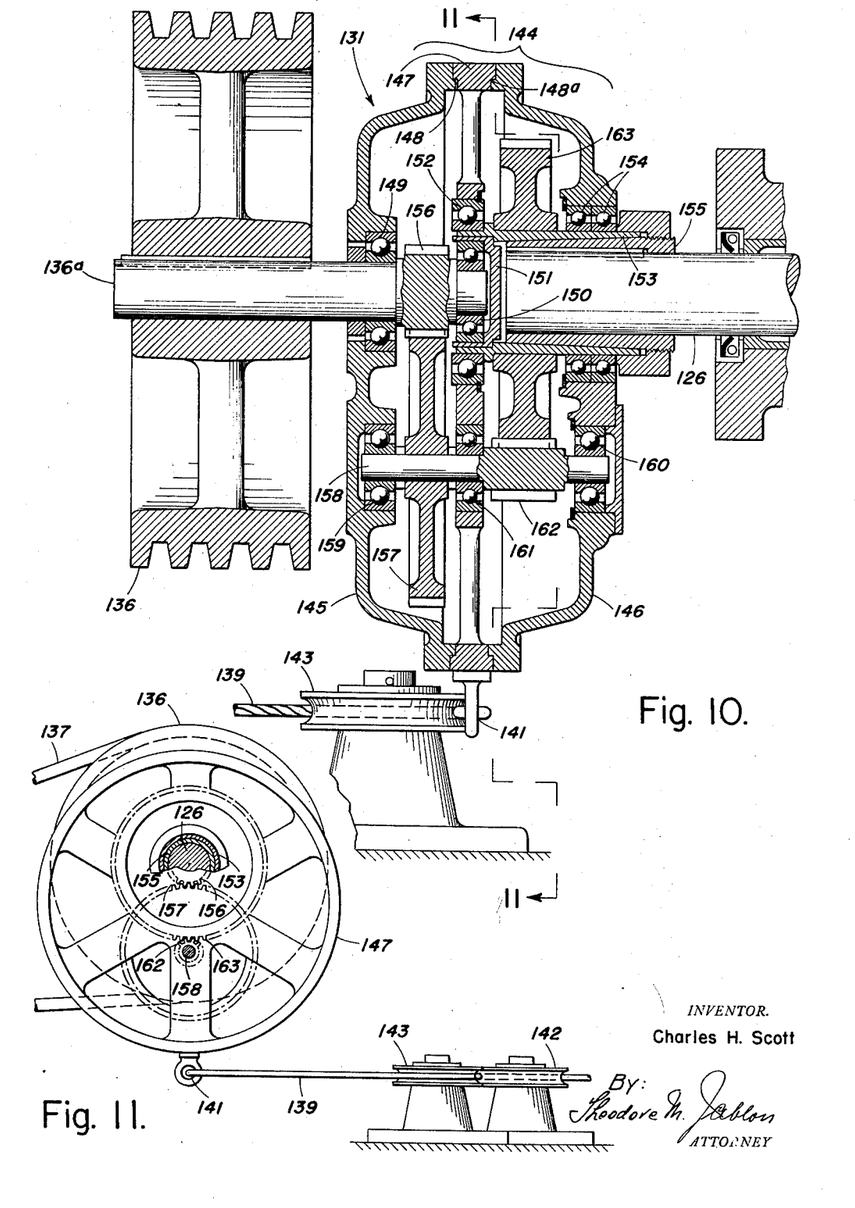
Figure 10 is a detail vertical sectional view taken on line 10—10 in Figure 9 of one of the two reduction gear units.
Figure 11 is a cross-sectional view taken on line 11—11 of Figure 10.

Referring to Figures 10 and 11, there will now be rendered a detailed description of the reduction gear unit 131 which is in fact identical to the reduction gear unit 130.

The reduction gear unit 130 presents itself as a housing 144 split transversely of the longitudinal axis of the input shaft 136 which shaft is coaxial with the output shaft as represented by the worm shaft 126.

Thus, the housing 144 comprises a pair of half shells 145 and 146, and interposed between the half shells a bearing plate 147 centered with respect to the half shells 145 and 146 as at 148 and at 148a. The input shaft 131a rotates in a pair of ball bearings, namely an outer bearing 149 mounted in the half shell 145, and an inner bearing 150 fitted into a cup-shaped member 151 which in turn rotates in a surrounding bearing 152 mounted in the bearing plate 147. In fact, the cup-shaped member 151 has a tight fit in an adaptor sleeve member 153 which is thus rotatably supported in and by the surrounding bearing 152 as the inner bearing and by another bearing 154 mounted in the other half shell 146 representing the outer bearing for the output shaft or wormshaft 126. The output shaft 126 is coaxial with the input shaft 131a and is rigidly connected to the surrounding adaptor sleeve member 153 by means of a longitudinally split wedge sleeve 155 having a fitted tapered seat in the surrounding adaptor sleeve member 153.

The reduction gearing proper for transmitting the driving torque from the input shaft 131a to the output shaft 126 comprises a primary pinion 156 fixed upon or unitary with the input shaft 131a, a primary gear 157 meshing with pinion 156. The gear 157 is fixed upon a countershaft 158 the ends of which are supported in outer bearings 159 and 160 respectively, which bearings are mounted in the half shells 145 and 146 respectively. The countershaft 158 also has an intermediate bearing 161 mounted in the bearing plate 147. A secondary pinion 162 is fixed upon or integral with countershaft 158 and disposed between bearing 160 and 161 and it has meshing with it a secondary gear 163 fixed upon and rotating with the adaptor sleeve member 153 and thus unitary with the output shaft or worm shaft 126.

Referring again to the Figure 9 arrangement, it will now be understood that a torque reaction is executed upon the housing 144 about the common axis of the input and output shafts, and in order for the reduction gear unit to transmit driving torque the housing 144 must be held by suitable restraining means against rotation. In the present embodiment of the invention, such restraint is imposed upon the housing of each of the gear units by the interbalancing connection 139 above described. In this way, the torque reaction of the housing of the one gear unit is interbalanced with the torque reaction of the housing of the other gear unit, and primary compensating torque transmitting means are thus provided for the motor to transmit interbalanced shares of the motor driving torque to the respective twin worm shafts. Each of these twin worm shafts in turn representing a secondary torque interbalancing means because of its axially balanced condition, applies equal interbalanced shares of driving torque to its associated pair of drive pinions engaging the bull gear 116a. As a net result, all four drive pinions 117, 118, 124 and 125 receive from the motor equal interbalanced shares of the driving torque.

I claim:
1. Drive mechanism for a rotary structure turntable about a vertical axis upon a central annular thrust bearing mounted upon a supporting frame, such as the rotary rake structure of a center pier type sedimentation tank where the rake structure has a central cage portion rotatably supported upon and surrounding the center pier and the mechanism is mounted upon said frame supported by said pier, which mechanism comprises an internally toothed bull gear provided at the top end of the cage portion for rotating the rake structure, a pair of trains of torque transmitting elements, disposed within the area substantially defined by the area of said bull gear, said trains terminating at their outer ends in drive pinions having driving engagement with said bull gear at diametrically opposed points thereof for imparting a balanced net drive torque thereto, a drive motor and primary compensatory torque distributing means associated therewith for applying interbalanced equal shares of driving torque from the motor through said respective gear trains to the bull gear, characterized thereby that each gear train comprises a pair of drive pinions horizontally spaced from one another and engaging said bull gear and the one pair of pinions is disposed diametrically opposite and symmetrical with respect to the other pair, a worm gear co-axially associated with each pinion for rotating the same, and secondary compensatory torque transmitting means in the form of thrust-free horizontal axially floating worm shaft for each pair of pinions, said shaft having a pair of worms of opposing pitch each engaging a respective worm gear, for imparting interbalanced equal shares of driving torque thereto, said worm shafts being spaced a horizontal distance apart and in parallel relationship with respect to one another and driven simultaneously from said motor through said primary compensatory torque imparting means operatively connected with the inner ends of said thrustfree worm shafts so that balanced net driving torque is imparted to the bull gear through four separate points of drive pinion engagement along the inner periphery of the gear.

2. Drive mechanism according to claim 1, in which the primary compensatory torque transmitting means comprises a differential gear unit having a pair of output shafts, and each gear train comprises positive drive transmitting means effective between each worm shaft and a respective output shaft of said differential gear device.

3. Drive mechanism according to claim 1, in which the primary compensatory torque transmitting means comprises a differential gear device having a pair of output shafts, in which the one gear train comprises a pair of drive pinions together with said worm gears and said double-acting worm shaft, and positive torque transmitting means between one of said output shafts and said worm shaft, and in which the other gear train comprises a single drive pinion engaging the bull gear, and positive drive transmitting means effective between the said single pinion and the other output shaft, said differential gear device being such as to apply to said single pinion a torque only half as large as that applied to the double-acting shaft of the first gear train.

4. The drive mechanism according to claim 1 in which the primary compensatory torque transmitting means comprises a pair of reduction gear units each having a housing, a high speed input shaft, and a low speed output shaft coaxially with the input shaft, each such reduction gear unit being associated in driving relationship with a respective double-acting wormshaft in a manner whereby said wormshaft represents said low speed output shaft, whereby the gear housing and thus the gear unit is bodily supported in a floating manner upon and by the associated wormshaft with both input shafts having positive drive connection with and being driven by said motor, with the addition of an interbalancing connection effective between the housing of the one gear unit and the housing of the other gear unit, for interbalancing the drive torque of the one housing with the drive torque of the other housing.

5. Drive mechanism for the raking structure of a center pier type sedimentation tank, with the raking structure having a central cage portion rotatably supported upon and surrounding the center pier, which mechanism is mounted atop the pier and comprises an internal bull gear provided at the top end of the cage portion for rotating the rake structure, a pair of gear trains terminating at their outer ends in drive pinions having driving engagement with said bull gear at diametrically opposed points thereof for imparting a balanced net drive torque thereto, a drive motor, and primary compensatory torque transmitting means associated with said motor applying interbalanced equal shares of driving torque from the motor through said respective gear trains to the bull gear, characterized thereby that each gear train comprises a pair of drive pinions horizontally spaced from one another and engaging said bull gear and the one pair of pinions is disposed diametrically opposite and symmetrical with respect to the other pair, a worm gear coaxially associated with each pinion for rotating the same, and secondary compensatory torque transmitting means in the form of a double-acting horizontal axially floating worm shaft for each pair of pinions, said shaft having a pair of worms of opposing pitch each engaging a respective worm gear, for imparting interbalanced equal shares of driving torque thereto, said worm shafts being spaced a horizontal distance apart and in parallel relationship with respect to one another and drivers simultaneously from said motor through said primary compensatory torque imparting means so that balanced net driving torque is imparted to the bull gear through four separate points of drive pinion engagement along the inner periphery of the gear, with the addition that said primary compensatory torque transmitting means comprise a differential gear mechanism having a gear housing, a pair of horizontal output shafts extending from said housing coaxially in opposite directions and parallel to said worm shafts, whereby the end of each output shaft has parallel as well as overlapping relationship with the end of a respective worm shaft, and thrustfree positive rotation transmitting means between each output shaft and the associated inner end of the respective worm shaft.

6. Drive mechanism according to claim 5, in which said thrustfree positive rotation transmitting means comprise a pair of intermeshing spur gears fixed upon the worm shaft and the associated output shaft respectively.

References Cited in the file of this patent

UNITED STATES PATENTS

| | | |
|---|---|---|
| 1,078,837 | Curtis | Nov. 18, 1913 |
| 1,409,319 | Vaughn | Mar. 14, 1922 |
| 1,471,295 | Thorp | Oct. 16, 1923 |
| 1,812,819 | Wollensak | June 30, 1931 |
| 1,825,957 | Johnson | Oct. 6, 1931 |
| 2,322,719 | Scott | June 22, 1943 |
| 2,546,969 | Buckendale | Apr. 3, 1951 |
| 2,557,316 | Scott | June 19, 1951 |
| 2,570,191 | Beckwith | Oct. 9, 1951 |
| 2,589,298 | Scott | Mar. 18, 1952 |
| 2,674,367 | White | Apr. 6, 1954 |

FOREIGN PATENTS

| | | |
|---|---|---|
| 193,245 | Great Britain | Feb. 22, 1923 |
| 557,471 | Great Britain | Nov. 22, 1943 |